(12) United States Patent
Yoo et al.

(10) Patent No.: US 12,242,697 B2
(45) Date of Patent: Mar. 4, 2025

(54) TOUCH SENSOR AND IMAGE DISPLAY DEVICE INCLUDING THE SAME

(71) Applicant: DONGWOO FINE-CHEM CO., LTD., Jeollabuk-do (KR)

(72) Inventors: Dong Bin Yoo, Jeollabuk-do (KR); Sun Ju Kim, Jeollabuk-do (KR); Jeong Yong Seo, Jeollabuk-do (KR); Hee Yong Lee, Jeollabuk-do (KR); Yong Sun Han, Jeollabuk-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 18/585,337

(22) Filed: Feb. 23, 2024

(65) Prior Publication Data
US 2024/0302929 A1    Sep. 12, 2024

(30) Foreign Application Priority Data

Mar. 8, 2023 (KR) .................. 10-2023-0030445

(51) Int. Cl.
*G06F 3/044* (2006.01)

(52) U.S. Cl.
CPC .. *G06F 3/0445* (2019.05); *G06F 2203/04112* (2013.01)

(58) Field of Classification Search
CPC ......... G06F 3/0445; G06F 2203/04112; G06F 3/0412; G06F 2203/04103; G06F 3/0443; G06F 3/0446; G06F 3/041; C23C 14/14; C23C 14/20; C23C 14/34; B32B 7/023; B32B 27/08; B32B 27/308; B32B 37/24; B32B 2457/208
USPC ....................................................... 345/174
See application file for complete search history.

(56) References Cited

U.S. PATENT DOCUMENTS

2018/0113344 A1*  4/2018  Shimoji ............... G06F 3/0446

FOREIGN PATENT DOCUMENTS

KR   10-2014-0092366 A   7/2014
KR   10-2017-0141674 A   12/2017

\* cited by examiner

*Primary Examiner* — Amare Mengistu
*Assistant Examiner* — Gloryvid Figueroa-Gibson
(74) *Attorney, Agent, or Firm* — The PL Law Group, PLLC (57) ABSTRACT

A touch sensor according to an embodiment includes a transparent substrate layer having an active region and an inactive region, and a conductive pattern formed on the active region and including a stacked structure of a metal layer and a blackened layer. A color difference defined by Equation 1 is 10 or less.

13 Claims, 5 Drawing Sheets

NAR

FIG. 11

TOUCH SENSOR AND IMAGE DISPLAY DEVICE INCLUDING THE SAME

CROSS-REFERENCE TO RELATED APPLICATION AND CLAIM OF PRIORITY

This application claims the benefit under 35 USC § 119 of Korean Patent Application No. 10-2023-0030445 filed on Mar. 8, 2023, in the Korean Intellectual Property Office (KIPO), the entire disclosure of which is incorporated herein by reference for all purposes.

BACKGROUND

1. Field

The present invention relates to a touch sensor and an image display device including the same.

2. Description of the Related Art

As information technologies are being developed, various demands in display devices having thinner dimension, lightweight, high efficiency in power consumption, etc., are increasing. The display device may include a flat panel display device such as a liquid crystal display (LCD) device, a plasma display panel (PDP) device, an electro-luminescent display device, an organic light emitting diode (OLED) display device, etc.

A touch panel or a touch sensor is combined with the display device so that display and information input functions may be implemented in one electronic device.

An image quality implemented from the image display device may be degraded by sensing electrodes included in the touch sensor. For example, conductive patterns of the touch sensor may be visually recognized by a user to disturb the image.

SUMMARY

According to an aspect of the present invention, there is provided a touch sensor having reduced external visibility.

According to an aspect of the present invention, there is provided an image display device including a touch sensor having reduced external visibility.

The above aspects of the present inventive concepts will be achieved by the following features or constructions:

(1) A touch sensor, including: a transparent substrate layer having an active region and an inactive region; and a conductive pattern formed on the active region, the conductive pattern comprising a stacked structure of a metal layer and a blackened layer; wherein a color difference defined by Equation 1 is 10 or less:

$$\text{Color difference} = \sqrt{(a_s^* - a_m^*)^2 + (b_s^* - b_m^*)^2} \quad \text{[Equation 1]}$$

wherein, in Equation 1, $a_s^*$ and $b_s^*$ are a* and b* values of a Commission Internationale de l'Eclairage (CIE) L*a*b* colorimetric system measured on the inactive region, respectively, and $a_m^*$ and $b_m^*$ are a* and b* values of the CIE L*a*b* colorimetric system measured on the active region, respectively.

(2) The touch sensor according to the above (1), wherein the metal layer is directly formed on the active region, and the blackened layer is formed on the metal layer.

(3) The touch sensor according to the above (1), wherein the blackened layer is formed directly on the active region, and the metal layer is formed on the blackened layer.

(4) The touch sensor according to the above (1), wherein the blackened layer includes a first blackened layer and a second blackened layer, and the first blackened layer is formed directly on the active region, the metal layer is formed on the first blackened layer, and the second blackened layer is formed on the metal layer.

(5) The touch sensor according to the above (1), wherein the conductive pattern further includes a transparent conductive oxide layer formed on the blackened layer.

(6) The touch sensor according to the above (1), further including an auxiliary substrate layer formed between the transparent substrate layer and the conductive pattern.

(7) The touch sensor according to the above (1), wherein the metal layer includes at least one selected from the group consisting of Al, Ag, Au, Pt, Pd, Ni, Nb, Mo, Ta, Ti, V, Cr, Fe, Mn, Ca, Co, W, Zn, Sn, Zr, In and Cu.

(8) The touch sensor according to the above (1), wherein the blackened layer includes a metal or a metal compound, and the metal includes at least one selected from the group consisting of Al, Ag, Au, Pt, Pd, Ni, Nb, Mo, Ta, Ti, V, Cr, Fe, Mn, Ca, Co, W, Zn, Sn, Zr, In and Cu, and the metal compound includes the metal and at least one of C, H, N and O.

(9) The touch sensor according to the above (1), wherein a thickness of the blackened layer is in a range from 320 Å to 370 Å.

(10) The touch sensor according to the above (1), including: a first electrode layer formed on the transparent substrate layer, the first electrode layer including the conductive pattern; an insulating interlayer formed on the first electrode layer; and a second electrode layer formed on the insulating interlayer, the second electrode layer including the conductive pattern.

(11) The touch sensor according to the above (10), wherein the first electrode layer and the second electrode layer each has a mesh structure, and the mesh structure includes the conductive pattern.

(12) The touch sensor according to the above (10), further including a protective layer formed on the second electrode layer.

(13) An image display device, including: a display panel; and the touch sensor according to the above-described embodiments stacked on the display panel.

A touch sensor according to embodiments of the present invention includes a transparent substrate layer and a conductive pattern disposed on the transparent substrate layer.

In example embodiments, the conductive pattern includes a stacked structure of a metal layer and a blackened layer. Accordingly, a color difference between an active region and an inactive region of the touch sensor may be reduced. Thus, the conductive pattern of the touch sensor may be from being visually recognized by a user so that an image quality of an image display device including the touch sensor may be improved.

The color difference defined by Equation 1 between the active region and the inactive region of the touch sensor may be adjusted to be less than or equal to a predetermined value. Accordingly, the color difference between the active region in which the conductive pattern is disposed and the inactive region in which the conductive pattern is not disposed may be sufficiently reduced, so that the conductive pattern may not be visually recognized by the user.

DETAILED DESCRIPTION OF THE EMBODIMENTS

According to exemplary embodiments of the present invention, there is provided a touch sensor having high resolution. For example, the touch sensor may be provided as a fingerprint sensor. Further, an image display device including the touch sensor are provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
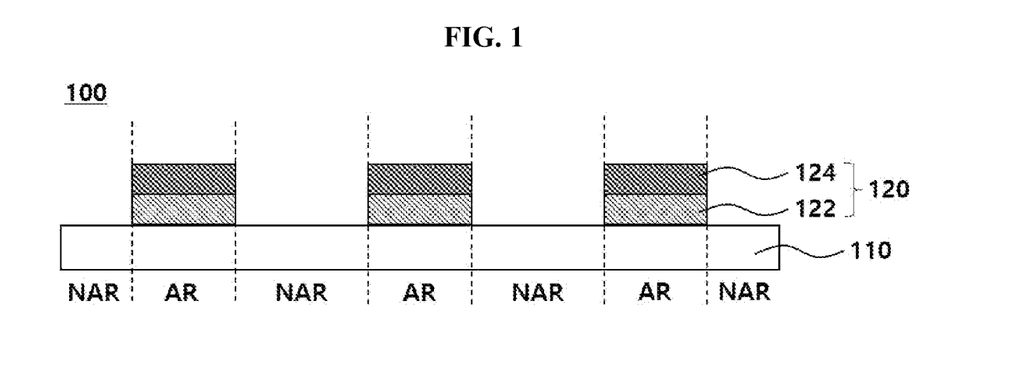
FIG. 1 is a schematic cross-sectional view illustrating a touch sensor in accordance with exemplary embodiments.

FIG. 1 is a schematic cross-sectional view illustrating a touch sensor in accordance with exemplary embodiments.

The term "touch sensor" used herein is intended to encompass a sensor for inputting a direction or generating a signal according to a touch of a user's finger or tool, and a sensor for generating a signal by recognizing a fingerprint shape of a finger.

Referring to FIG. 1, a touch sensor 100 includes a transparent substrate layer 110 and a conductive pattern 120 disposed on the transparent substrate layer 110.

The transparent substrate layer 110 includes an active region AR in which the conductive pattern 120 is disposed and an inactive region NAR in which the conductive pattern 120 is not disposed.

For example, the active region AR may refer to an area from which a signal is generated and transmitted by recognizing a user's touch.

The transparent substrate layer 110 may include, e.g., a transparent resin film. For example, the transparent substrate layer 110 may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth)acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination of two or more thereof.

The transparent substrate layer 110 may include an adhesive material such as an optically clear adhesive (OCA) or an optically clear resin (OCR). In some embodiments, the transparent substrate layer 110 may include an inorganic insulating material such as silicon oxide, silicon nitride, silicon oxynitride, glass, etc.

For example, a thickness of the transparent substrate layer 110 may be 10 μm to 200 μm.

In example embodiments, the conductive pattern 120 includes a stacked structure of a metal layer 122 and a blackened layer 124.

For example, the blackening layer 124 may be formed to have a darker color or a lower reflectance than that of the metal layer 122, or a color sense (a* value, b* value) described with reference to Equation 1 may be different from that of the metal layer 122. Accordingly, a color difference between the active region AR and the non-active region NAR may be reduced. Thus, the conductive pattern 120 of the touch sensor 100 from may be prevented from being visible to the user, and an image quality of an image display device including the touch sensor 100 may be improved.

For example, the a* and b* values of the Commission Internationale de l'Eclairage (CIE) L*a*b* colorimetric system may be adjusted by changing the thickness and/or formation conditions of the blackened layer 124. Accordingly, the thickness and/or the formation conditions of the blackened layer 124 may be adjusted so that the color difference may be sufficiently reduced. For example, the formation conditions may include a layer forming temperature, a layer forming speed, an input gas flow rate, etc.

In some embodiments, the metal layer 122 may include at least one of Al, Ag, Au, Pt, Pd, Ni, Nb, Mo, Ta, Ti, V, Cr, Fe, Mn, Ca, Co, W, Zn, Sn, Zr, In and Cu. These may be used alone or in a combination of two or more therefrom. For example, the metal layer 122 may include a mixture or an alloy of two or more of the above metals.

In one embodiment, the metal layer 122 may include silver (Ag) or a silver alloy (e.g., a silver-palladium-copper (APC) alloy) to implement low resistance. In one embodiment, the metal layer 122 may include copper (Cu) or a copper alloy (e.g., a copper-calcium (CuCa) or a copper-nickel (CuNi) alloy) in consideration of low resistance and fine line width patterning.

For example, the metal layer 122 may be formed on the active region AR of the transparent substrate layer 110 by a dry method or a wet method. The dry method may include a sputtering method, a vapor deposition method, an ion plating method, etc. The wet method may include an electroplating method, etc.

For example, a thickness of the metal layer 122 may be in a range from 1,000 Å to 5,000 Å. Within the above range, the metal layer 122 may be prevented from being formed in a reverse-taper shape while maintaining the low resistance of the conductive pattern 120. Within the above range, an increase of an etching temperature or an etching time due to a thickness increase of the metal layer 122 may be prevented.

Accordingly, a reverse-taper shape of the metal layer 122 caused when a lower portion of the metal layer 122 is excessively etched relatively to an upper portion thereof may be prevented. Thus, an organic layer (e.g., an insulating interlayer) may be uniformly coated on the upper portion of the metal layer 122, and cracks and/or disconnection of another metal layer or the blackened layer 124 formed on the upper portion of the metal layer 122 may be prevented.

In some embodiments, quality and driving stability of the touch sensor 100 may be further improved by adjusting the thickness range of the metal layer 122 in the above range.

In some embodiments, the blackened layer 124 may include a metal and/or a metallic compound.

The metal may include at least one selected from the group consisting of Al, Ag, Au, Pt, Pd, Ni, Nb, Mo, Ta, Ti, V, Cr, Fe, Mn, Ca, Co, W, Zn, Sn, Zr, In and Cu.

The metallic compound may include the metal, and at least one of C, H, N and O.

For example, the blackened layer 124 may include a compound in which a mixture or an alloy of two or more of the metals may be combined with at least one of C, H, N and O. For example, the blackened layer 124 may include the metal or a mixture of the metal and at least one of the metal and C, H, N and O, or may include both the metal and the mixture together.

In some embodiments, a thickness of the blackened layer 124 may be in a range from 320 Å to 370 Å. In the above range, a color difference between the active region AR and the inactive region NAR may be sufficiently reduced, and a light reflection on the surface of the metal layer 122 may be suppressed. Accordingly, the visual recognition of the conductive pattern 120 to the user may be further suppressed.

For example, the blackened layer 124 may be formed by a dry method or a wet method.

For example, the dry method may include a sputtering method, a vapor deposition method, an ion plating method, etc. The wet method may include an electroplating method.

For example, the dry method may include the sputtering method to adjust the layer thickness more easily.

In some embodiments, the blackened layer 124 may be formed using a reactive sputtering method, or may be formed by a deposition using a blackened layer target. For example, the deposition may be performed without introducing a reactive gas.

In example embodiments, ae color difference defined by Equation 1 below is 10 or less.

$$\text{Color difference} = \sqrt{(a_s^* - a_m^*)^2 + (b_s^* - b_m^*)^2} \quad \text{[Equation 1]}$$

In Equation 1, $a_s^*$ and $b_s^*$ are the a* and b* values of a Commission Internationale de l'Eclairage (CIE) L*a*b* colorimetric system measured on the inactive region (NAR), respectively, and $a_m^*$ and $b_m^*$ are the a* and b* values of the CIE L*a*b* colorimetric system measured on the active region (AR), respectively.

The term "CIE L*a*b* colorimetric system" herein is a colorimetric system standardized and recommended by CIE in 1976 that is widely known in the related art.

In the colorimetric system, as the a* value becomes greater in a positive range, a color may become closer to a red color. As the a* value becomes smaller in a negative range, a color may become closer to a green color.

In the colorimetric system, as the b* value becomes greater in a positive range, a color may become closer to a yellow color. As the b* value becomes smaller in a negative range, a color may become closer to a blue color.

In the colorimetric system, an L* value may represent, e.g., a brightness,

In the colorimetric system, a Y value may represent a reflectance.

For example, optical properties of the touch sensor may be evaluated from the Y value, the a* value, and the b* value.

The color difference may refer to a difference between a color measured on the active region AR of the touch sensor 100 and a color measured on the inactive region NAR of the touch sensor 100.

In the color difference range, the color difference between the active region AR in which the conductive pattern 120 is disposed and the inactive region NAR in which the conductive pattern 120 is not disposed may be sufficiently reduced so that the conductive pattern 120 may not be visually recognized by the user.

For example, the color difference may be adjusted by changing the thickness, layer formation conditions, layer components, etc., of the blackened layer 124.

In some embodiments, the reflectance of the conductive pattern 120 may be decreased by the blackened layer 124. For example, a reflectance $Y_m^*$ of the active region AR in which the conductive pattern 120 is disposed may be in a range from 7 to 15, preferably from 8.6 to 12. The reflectance $Y_m^*$ may represent the reflectance in the CIE colorimetric system.

As illustrated in FIG. 1, the stacked structure of the conductive pattern 120 may include the metal layer 122 formed directly on the active region AR of the transparent substrate layer 110 and the blackened layer 124 formed on the metal layer 122. Optical properties of the metal layer 122 may be controlled by the blackened layer 124, so that the color difference may be reduced. For example, the control of the optical properties may include reducing the reflectance of the conductive pattern 120 and adjusting the a* value and b* value.

Figure 2:
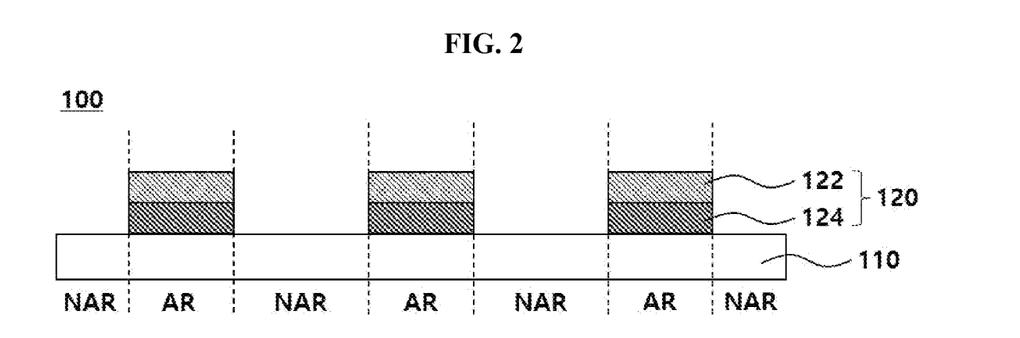
FIG. 2 is a schematic cross-sectional view illustrating a touch sensor in accordance with exemplary embodiments.

FIG. 2 is a schematic cross-sectional view illustrating a touch sensor in accordance with exemplary embodiments.

Referring to FIG. 2, in some embodiments, the stacked structure of the conductive pattern 120 may include the blackened layer 124 formed directly on the active region AR of the transparent substrate layer 110 and the metal layer 122 formed on the blackened layer 124. Accordingly, the above-described optical properties (e.g., the reduction of reflectance, adjustment of the a* and b* values) of the conductive pattern 120 with respect to a light irradiated to a lower portion of the touch sensor 100 may be controlled to reduce the color difference.

For example, the a* value and b* value may be adjusted by changing the thickness and/or the layer formation conditions of the blackened layer 124. Accordingly, the color difference may be more easily adjusted.

Figure 3:
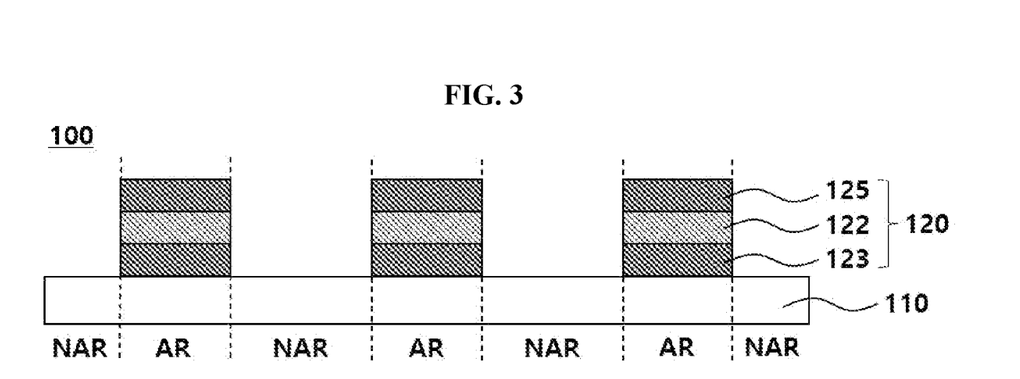
FIG. 3 is a schematic cross-sectional view illustrating a touch sensor in accordance with exemplary embodiments.

FIG. 3 is a schematic cross-sectional view illustrating a touch sensor in accordance with exemplary embodiments.

Referring to FIG. 3, in some embodiments, a stacked structure of the conductive pattern 120 may include a first blackened layer 123 directly formed on the active region AR of the transparent substrate layer 110, the metal layer 122 formed on the first blackened layer 123 and a second blackened layer 125 formed on the metal layer 122. Accordingly, the above-described optical properties of the conductive pattern 120 with respect to a light irradiated to upper and lower portions of the touch sensor 100 may be controlled so that the color difference between the active region AR and the inactive region NAR may be reduced.

For example, the reflectance, the a* value and the b* value may be adjusted by changing of thickness and layer formation conditions of the first blackened layer 123 and/or the second blackened layer 125. Accordingly, the color difference may be more easily adjusted.

Figure 4:
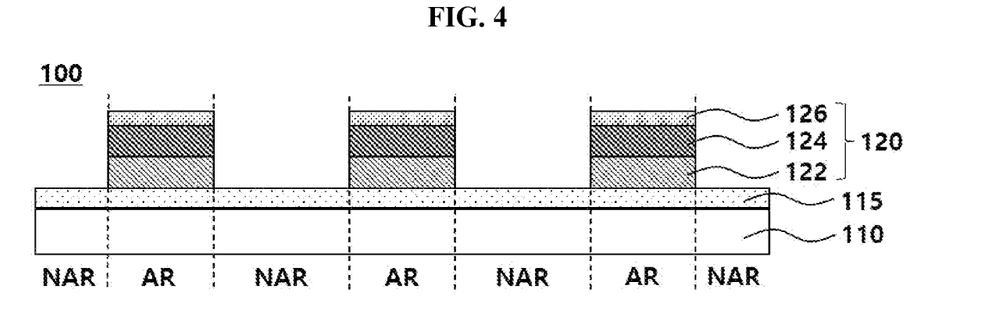
FIG. 4 is a schematic cross-sectional view illustrating a touch sensor in accordance with exemplary embodiments.

FIG. 4 is a schematic cross-sectional view illustrating a touch sensor in accordance with exemplary embodiments.

Referring to FIG. 4, the conductive pattern 120 may further include a transparent conductive oxide layer 126 formed on the blackened layer 124. Accordingly, the metal layer 122 and/or the blackened layer 124 may be protected from an external environment.

In some embodiments, a thickness of the transparent conductive oxide layer 126 may be smaller than that of the blackened layer 124. Accordingly, effects of suppressing the light reflection and reducing the color difference of the blackened layer 124 may be prevented from being degraded.

For example, the transparent conductive oxide layer 126 may include at least one of indium tin oxide (ITO), indium zinc oxide (IZO), indium zinc oxide (ITZO) and zinc oxide (ZnOx).

In some embodiments, the touch sensor 100 may further include an auxiliary substrate layer 115 formed between the transparent substrate layer 110 and the conductive pattern 120.

For example, an adhesion between the transparent substrate layer 110 and the conductive pattern 120 may be improved by the auxiliary substrate layer 115, thereby improving structural stability of the touch sensor 100. For example, optical properties of the touch sensor 100 may be controlled by adjusting a material, a thickness, etc., of the auxiliary substrate layer 115.

For example, the auxiliary substrate layer 115 may be provided as an organic film layer.

For example, the auxiliary substrate layer 115 may include an acrylic resin, an epoxy resin, a urethane resin, a silicone resin, a melamine resin, a cycloolefin resin, a siloxane resin, etc. These may be used alone or in a combination of two or more therefrom. For example, the auxiliary substrate layer 115 may include a hybrid resin in which the above-mentioned resins are mixed or integral with each other. For example, the auxiliary substrate layer 115 may include a compound including at least one of the resins and another material.

Figure 5:
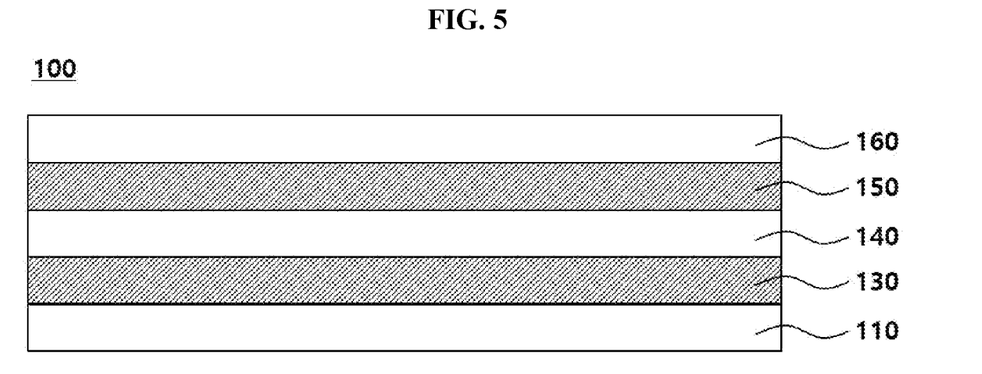
FIG. 5 is a schematic cross-sectional view illustrating a touch sensor in accordance with exemplary embodiments.

FIG. 5 is a schematic cross-sectional view illustrating a touch sensor in accordance with exemplary embodiments.

Referring to FIG. 5, the touch sensor 100 may include an electrode layer having a multi-layered structure.

In example embodiments, the touch sensor 100 may include a first electrode layer 130 formed on the transparent substrate layer 110, an insulating interlayer 140 formed on the first electrode layer 130, and a second electrode layer 150 formed on the insulating interlayer 140.

For example, the first electrode layer 130 and the second electrode layer 150 may include the conductive pattern 120 as described above. Accordingly, the electrode layer having the multi-layered structure may not be visually recognized by the user.

For example, each of the first electrode layer 130 and the second electrode layer 150 may include a mesh structure or a structure where a plurality of electrodes cross each other (e.g., a Tx/Rx structure).

In some embodiments, the first electrode layer 130 and the second electrode layer 150 may each include a mesh structure including a conductive pattern 120.

For example, the mesh structure may include mesh conductive lines intersecting each other, and the mesh conductive lines may include the conductive pattern 120. Accordingly, the optical properties (e.g., the reduction of the reflectance, adjustment of the a* and a* values) of the first electrode layer 130 and the second electrode layer 150 may be controlled so that the color difference between the active region AR and the inactive region NAR may be reduced. For example, the reflectance, the a* value and the b* value may be adjusted by changing thicknesses and/or layer formation conditions of the first electrode layer 130 and the second electrode layer 150. Thus, the color difference may be further reduced.

In example embodiments, the insulating interlayer 140 may be formed between the first electrode layer 130 and the second electrode layer 150.

The insulating interlayer 140 may serve as a dielectric layer that generates a mutual capacitance (Cm) between the first electrode layer 130 and the second electrode layer 150.

In example embodiments, the insulating interlayer 140 may include an organic polymer material in consideration of a dielectric constant and a flexibility for an application to an image display device.

For example, the insulating interlayer 140 may include an organic insulating material including a resin such as an acrylic resin, an epoxy resin, a urethane resin, a siloxane resin, etc. These may be used alone or in a combination of two or more therefrom. For example, the insulating interlayer 140 may include a hybrid resin of the above-mentioned resin.

For example, a resin composition including the organic insulating material may be applied on the transparent substrate layer 110 and the first electrode layer 130 by a printing process or a coating process such as an inkjet printing, a nozzle printing, a spin coating, a slit coating, etc., to form a coating layer. The coating layer may be cured, and developed or etched to form an insulating interlayer 140.

In some embodiments, the insulating interlayer 140 may include an inorganic insulating material such as silicon oxide, silicon oxynitride, silicon nitride, etc. For example, the inorganic insulating material may be deposited on the transparent substrate layer 110 and the first electrode layer 130 by a chemical vapor deposition (CVD) process, a physical vapor deposition (PVD) process, etc. The insulating interlayer 140 may be formed by dry-etching or wet-etching the deposited inorganic insulating material.

In some embodiments, the touch sensor 100 may further include a protective layer 160 formed on the second electrode layer 150. The protective layer 160 may serve, e.g., a protective layer of the touch sensor 100 or a surface layer to which a touch input is applied.

The protective layer 160 may include an organic insulating material including a resin such as an acrylic resin, an epoxy resin, a urethane resin, a siloxane resin, etc., or an inorganic insulating material such as silicon oxide, silicon oxynitride, silicon nitride. etc. These may be used alone or in a combination of two or more therefrom. For example, the protective layer 160 may include a hybrid resin of the above-mention resins.

For example, the insulating interlayer 140 may cover the first electrode layer 130, and the protective layer 160 may cover the second electrode layer 150. For example, at least a portion of the conductive pattern 120 included in the first electrode layer 130 may be buried in the insulating interlayer 140, and at least a portion of the conductive pattern 120 included in the second electrode layer 150 may be buried in the protective layer 160. Accordingly, the first electrode layer 130 and the second electrode layer 150 may be protected from an external environment.

Figure 6:
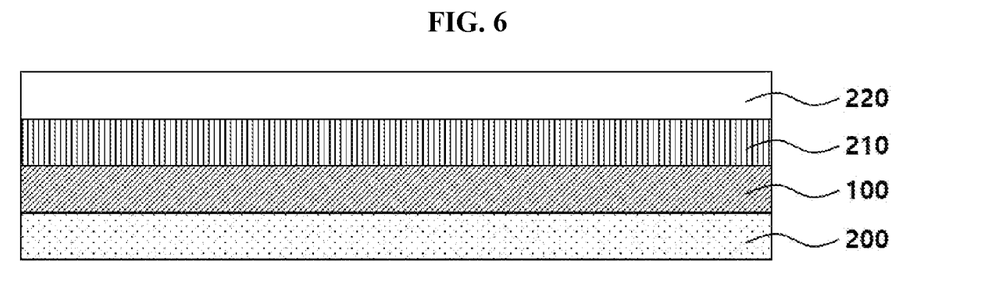
FIG. 6 is a schematic cross-sectional view illustrating an image display device in accordance with exemplary embodiments.

FIG. 6 is a schematic cross-sectional view illustrating an image display device in accordance with exemplary embodiments.

Referring to FIG. 6, the image display device may include a display panel 200 and the above-described touch sensor 100 disposed on the display panel 200.

In some embodiments, an optical layer 210 and a cover window 220 may be disposed on the display panel 200 and the touch sensor 100.

For example, the optical layer 210 may be a polarizing layer including a polarizer or a polarizing plate.

For example, the cover window 220 may include a glass (e.g., ultra-thin glass (UTG)) or a transparent resin film. Accordingly, an external impact applied to the touch sensor 100 may be reduced or buffered.

The conductive pattern 120 of the touch sensor 100 includes the blackened layer 124, and thus the color difference between the active region AR and the inactive region NAR may be reduced. Accordingly, deterioration of the image quality of the image display device or visual recognition of the conductive pattern 120 in a power-off state may be prevented.

Figure 7:
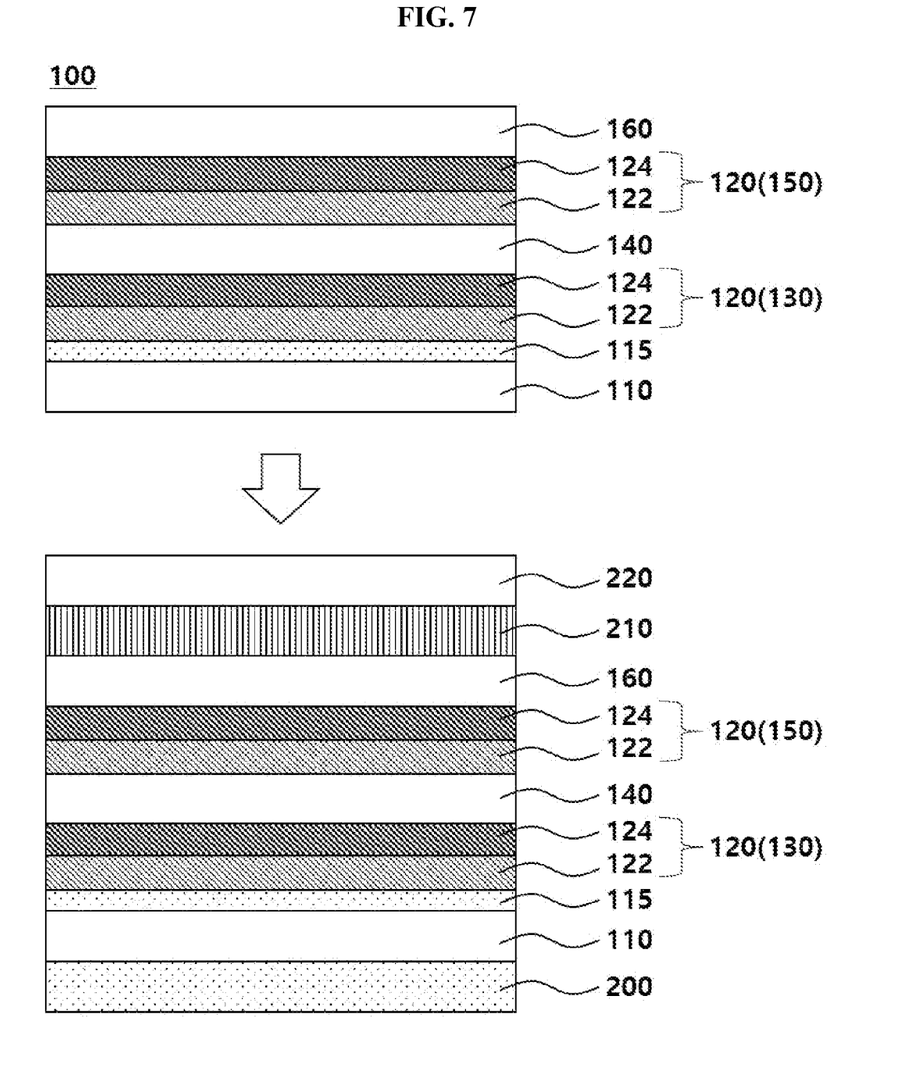
FIG. 7 is a schematic cross-sectional view illustrating a stacked structure of an image display device in accordance with exemplary embodiments.

FIG. 7 is a schematic cross-sectional view illustrating a stacked structure of an image display device in accordance with exemplary embodiments. FIG. 7 is a cross-sectional view illustrating a stacked structure of the touch sensor 100 including the conductive pattern 120 in which the first electrode layer 130 and the second electrode layer 150 may each have the structure described with reference to FIG. 1, and the display panel 200.

Referring to FIG. 7, the touch sensor 100 in which the first electrode layer 130, the insulating interlayer 140, the second electrode layer 150 and the protective layer 160 may be sequentially disposed on the transparent substrate layer 110 may be manufactured.

In an embodiment, the auxiliary substrate layer 115 may be formed between the transparent substrate layer 110 and the first electrode layer 130.

Each of the first electrode layer 130 and the second electrode layer 150 may include the conductive pattern 120 including the blackened layer 124 on the metal layer 122.

For example, the touch sensor 100 may be stacked on the display panel 200, and the optical layer 210 and the cover window 220 may be formed on the protective layer 160 to obtain the image display device.

Figure 8:
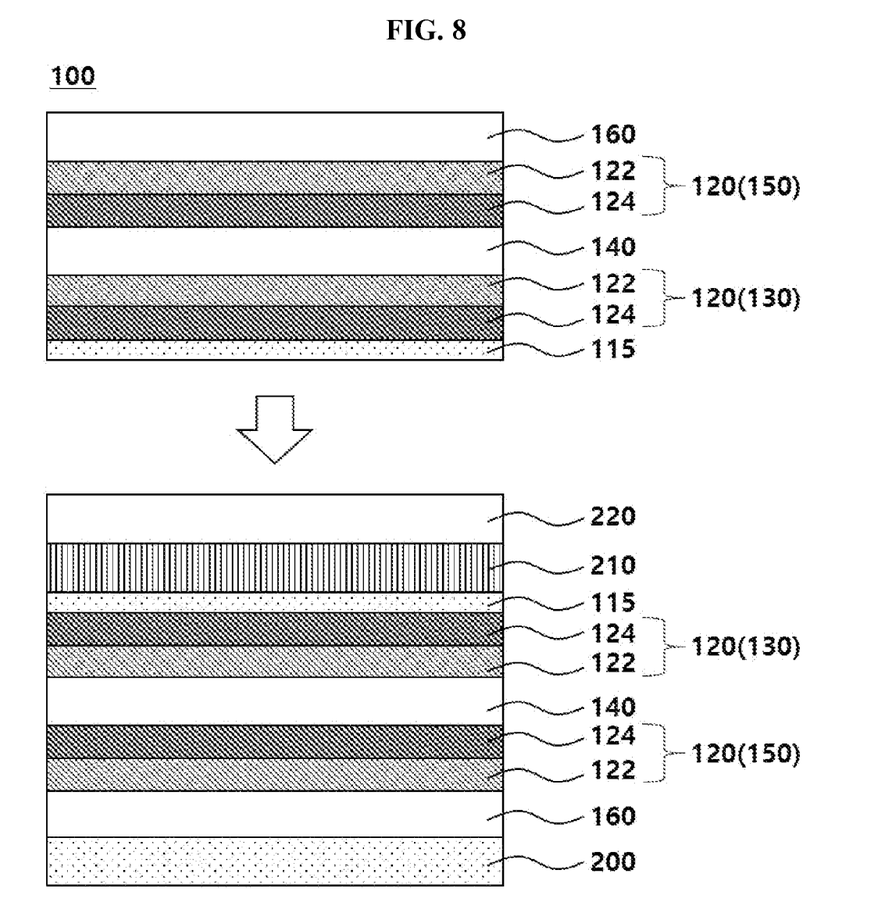
FIG. 8 is a schematic cross-sectional view illustrating a stacked structure of an image display device in accordance with exemplary embodiments.

FIG. 8 is a schematic cross-sectional view illustrating a stacked structure of an image display device in accordance with exemplary embodiments. FIG. 8 is a schematic cross-sectional view illustrating a stacked structure of the touch sensor 100 including the conductive pattern 120 in which the first electrode layer 130 and the second electrode layer 150 may each have the structure as described with reference to FIG. 2, and the display panel 200.

Referring to FIG. 8, the touch sensor 100 in which the first electrode layer 130, the insulating interlayer 140, the second electrode layer 150 and the protective layer 160 are sequentially disposed on the auxiliary substrate layer 115 may be manufactured.

For example, the transparent substrate layer 110 may be omitted or may be formed under a bottom surface of the auxiliary substrate layer 115. For example, when the transparent substrate layer 110 is omitted, the optical layer 210 of the image display device may be provided as a substrate.

Each of the first electrode layer 130 and the second electrode layer 150 may include the conductive pattern 120 in which the metal layer 122 is formed on the blackened layer 124.

In some embodiments, the touch sensor 100 may be vertically inverted and stacked on the display panel 200. For example, the protective layer 160 may be disposed on the display panel 200, and the optical layer 210 and the cover window 220 may be disposed on the auxiliary substrate layer 115 (or the transparent substrate layer 110).

For example, an appropriate method may be selected in consideration of a process efficiency and a product requirement from the above stacking methods described with reference to FIGS. 7 and 8.

Hereinafter, specific experimental examples including examples and comparative examples are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Examples 1 to 6 and Comparative Examples 1 to 4

(1) Sample Fabrication for Evaluating Optical Properties

Figure 9:
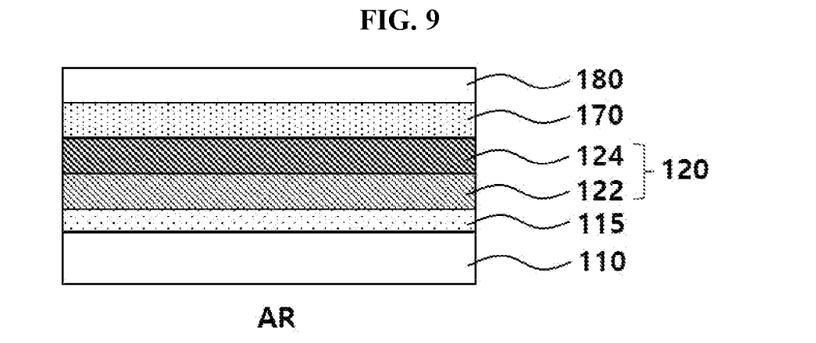
FIG. 9 is a schematic cross-sectional view of a sample for evaluating optical properties in an active region.
Figure 10:
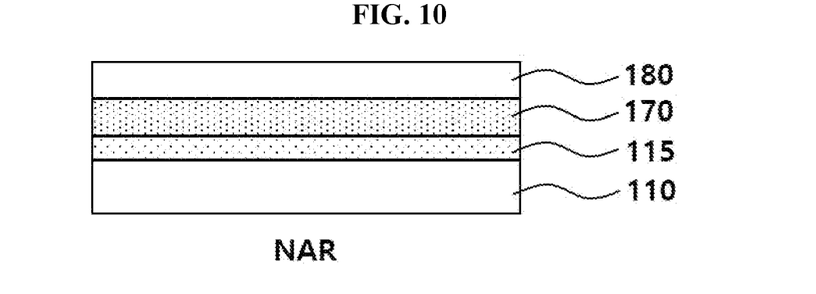
FIG. 10 is a schematic cross-sectional view of a sample for evaluating optical properties in an inactive region.

FIG. 9 is a schematic cross-sectional view of a sample for evaluating optical properties in an active region. FIG. 10 is a schematic cross-sectional view of a sample for evaluating optical properties in an inactive region.

1) Fabrication of a Sample for Evaluating the Optical Properties of the Active Region (AR)

Referring to FIG. 9, a stacked structure was formed by sequentially stacking the transparent substrate layer 110, the auxiliary substrate layer 115, the metal layer 122, the blackened layer 124, an upper insulating layer 170 and a cover layer 180 on the active region AR.

Specifically, an acrylic resin was applied and cured on a polymethyl methacrylate (PMMA) layer (corresponding to the transparent substrate layer 110) to form the auxiliary substrate layer 115 having a thickness of 3 μm.

A copper (Cu) layer (corresponding to the metal layer 122) having a thickness of 2,000 Å was formed on the auxiliary substrate layer 115 by a sputtering method (90° C., 17 kW condition).

A copper oxide (CuO) layer (corresponding to the blackened layer 124) having a thickness as shown in Table 1 was formed on the copper layer by a sputtering method (90° C., 4-12 kW, power split condition).

An acrylic resin layer having a thickness of 2 μm (corresponding to the upper insulating layer 170) and an acrylic resin layer having a thickness of 2 μm (corresponding to the cover layer 180) were sequentially stacked on the copper oxide layer.

2) Fabrication of a Sample for Evaluating the Optical Properties of the Inactive Region (NAR)

Referring to FIG. 10, a stacked structure was formed by sequentially stacking the transparent substrate layer 110, the auxiliary substrate layer 115, the upper insulating layer 170 and the cover layer 180 on the inactive region NAR.

A sample was fabricated by the same manner as that in the above-described sample for evaluating the optical characteristics of the active region AR, except that the metal layer 122 and the darkening layer 124 were not formed.

(2) Sample Fabrication for Visibility Evaluation

Figure 11:
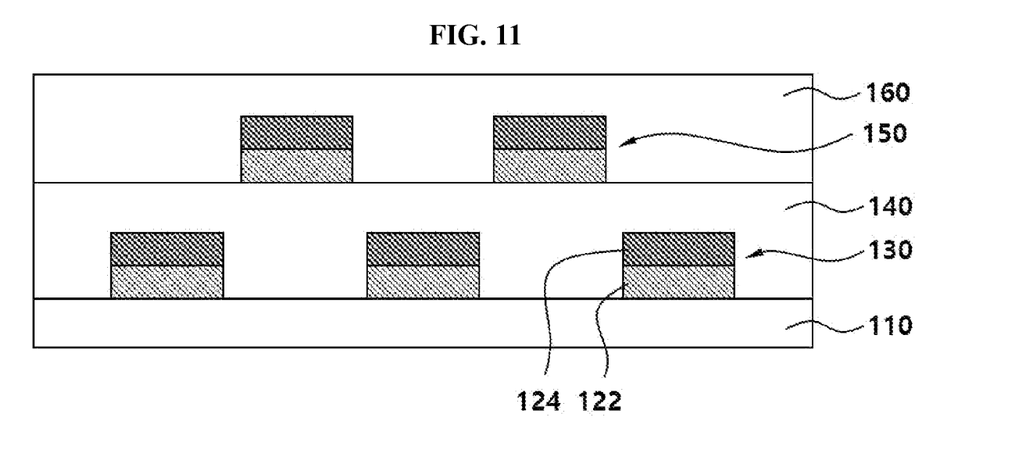
FIG. 11 is a schematic cross-sectional view of a sample for evaluating a visibility.

FIG. 11 is a schematic cross-sectional view of a sample for evaluating a visibility.

Referring to FIG. 11, the transparent substrate layer 110, the first electrode layer 130, the insulating interlayer 140, the second electrode layer 150 and the protective layer 160 were sequentially stacked to form a touch sensor.

A copper (Cu) layer (the metal layer 122) having a thickness of 2,000 Å was formed on a polymethyl methacrylate (PMMA) layer (corresponding to the transparent substrate layer 110) by a sputtering method (90° C., 17 kW condition).

A copper oxide (CuO) layer (corresponding to the blackened layer 124) having a thickness as shown in Table 1 was formed on the copper layer by a sputtering method (90° C., 4-12 kW, power split condition).

The copper layer and the copper oxide layer were etched by a photolithography process to form the first electrode layer 130 having a mesh structure.

A line width of mesh conductive lines included in the mesh structure was 3 μm.

An acrylic resin layer (corresponding to the insulating interlayer 140) having a thickness of 2 μm was formed on the first electrode layer 130 to cover the first electrode layer 130.

The metal layer 122 and the blackened layer 124 were formed on the acrylic resin layer by the same manner as that for the first electrode layer 130, and then the second electrode layer 150 having a mesh structure was formed by a photolithography process.

A line width of mesh conductive lines included in the mesh structure was 3 μm.

An acrylic resin layer (corresponding to the protective layer 160) having a thickness of 2 μm was formed on the second electrode layer 150 to cover the second electrode layer 150.

Comparative Example 5

A sample for evaluating optical properties and a sample for evaluating visibility were prepared by the same method as that in Example 3, except that a transfer speed of the carrier substrate was increased by 50% and a film formation speed was increased by increasing a sputtering power by 50% during the sputtering process.

Experimental Example (1) Evaluation of Optical Properties

For each sample for evaluating the optical properties of the active region AR and the optical characteristics of the inactive region NAR manufactured according to Examples and Comparative Examples, a spectrophotometer (CM-3600A, KONIKA MINOLTA Co., Ltd.) was used to measure $a_s^*$, $b_s^*$, $a_m^*$ and $b_m^*$ of Equation 1, and a reflectance ($Y_s^*$) of the inactive region (NAR) and a reflectance ($Y_m^*$) of the active region AR.

Specifically, a reflectance spectrum data was measured by irradiating a light having a wavelength of 360 nm to 740 nm at a 10 nm wavelength interval, and the reflectance Y, a* and b* values were calculated based on the corresponding values.

The light was irradiated toward the cover layer 180 or the protective layer 160 in a direction from the cover layer 180 or the protective layer 160 to the transparent substrate layer 110.

The color difference was calculated by substituting the measured $a_s^*$, $b_s^*$, $a_m^*$ and $b_m^*$ values into Equation 1.

(2) Evaluation of Visibility

Five inspectors visually observed and evaluated samples for evaluating THE visibility prepared according to Examples and Comparative Examples under A fluorescent lights and an external natural light (at noon of a clear weather without clouds).

The results are evaluated as follows.

X: The conductive pattern was observed by 2 or more inspectors

Δ: The conductive pattern was observed by 1 inspector

○: The conductive pattern was not observed for all inspectors

The evaluation results are shown in Tables 1 and 2 below.

TABLE 1

| | thickness of blackened layer (Å) | optical properties of active region (AR) | | | optical properties of inactive region (NAR) | | |
|---|---|---|---|---|---|---|---|
| | | $Y_m^*$ | $a_m^*$ | $b_m^*$ | $Y_s^*$ | $a_s^*$ | $b_s^*$ |
| Example 1 | 320 | 7 | 8 | −3.1 | 7.52 | 0.59 | 2.11 |
| Example 2 | 330 | 8.6 | 4.3 | −1.2 | | | |
| Example 3 | 340 | 10.2 | 0.7 | 0.7 | | | |
| Example 4 | 350 | 10.5 | 1.2 | 0.4 | | | |
| Example 5 | 360 | 12 | 2.9 | 4 | | | |
| Example 6 | 370 | 15 | 7.1 | 6.9 | | | |
| Comparative Example 1 | 270 | 12.7 | 23.1 | −12.2 | | | |
| Comparative Example 2 | 300 | 7.4 | 17.3 | −8.1 | | | |
| Comparative Example 3 | 310 | 7.2 | 12.2 | −5.2 | | | |
| Comparative Example 4 | 380 | 21 | 11.3 | 12.1 | | | |
| Comparative Example 5 | 340 | 13.0 | 8.9 | 9.5 | | | |

TABLE 2

| | color difference | visibility |
|---|---|---|
| Example 1 | 9.1 | ○ |
| Example 2 | 5.0 | ○ |
| Example 3 | 1.4 | ○ |
| Example 4 | 1.8 | ○ |
| Example 5 | 3.0 | ○ |
| Example 6 | 8.1 | ○ |
| Comparative Example 1 | 26.7 | X |
| Comparative Example 2 | 19.6 | X |
| Comparative Example 3 | 13.7 | Δ |
| Comparative Example 4 | 14.6 | Δ |
| Comparative Example 5 | 11.1 | Δ |

Referring to Tables 1 and 2, in Examples where the color difference defined by Equation 1 was 10 or less, the conductive pattern was not recognized by the user, thereby improving optical properties and aesthetics compared to those from Comparative Examples.

The sample of Comparative Example 5 included the blackened layer having the same thickness as that of the sample of Example 3, but the color difference was relatively increased due to a different layer formation rate.

What is claimed is:

1. A touch sensor comprising:
   a transparent substrate layer having an active region and an inactive region; and
   a conductive pattern formed on the active region, the conductive pattern comprising a stacked structure of a metal layer and a blackened layer;
   wherein a color difference defined by Equation 1 is 10 or less:

$$\text{Color difference} = \sqrt{(a_s^* - a_m^*)^2 + (b_s^* - b_m^*)^2} \quad \text{[Equation 1]}$$

wherein, in Equation 1, $a_s^*$ and $b_s^*$ are a* and b* values of a Commission Internationale de l'Eclairage (CIE) L*a*b* colorimetric system measured on the inactive region, respectively, and $a_m^*$ and $b_m^*$ are a* and b* values of the CIE L*a*b* colorimetric system measured on the active region, respectively.

2. The touch sensor according to claim 1, wherein the metal layer is directly formed on the active region, and the blackened layer is formed on the metal layer.

3. The touch sensor according to claim 1, wherein the blackened layer is formed directly on the active region, and the metal layer is formed on the blackened layer.

4. The touch sensor according to claim 1, wherein the blackened layer comprises a first blackened layer and a second blackened layer, and
   the first blackened layer is formed directly on the active region, the metal layer is formed on the first blackened layer, and the second blackened layer is formed on the metal layer.

5. The touch sensor according to claim 1, wherein the conductive pattern further comprises a transparent conductive oxide layer formed on the blackened layer.

6. The touch sensor according to claim 1, further comprising an auxiliary substrate layer formed between the transparent substrate layer and the conductive pattern.

7. The touch sensor according to claim 1, wherein the metal layer includes at least one selected from the group consisting of Al, Ag, Au, Pt, Pd, Ni, Nb, Mo, Ta, Ti, V, Cr, Fe, Mn, Ca, Co, W, Zn, Sn, Zr, In and Cu.

8. The touch sensor according to claim 1, wherein the blackened layer includes a metal or a metal compound, and
   the metal includes at least one selected from the group consisting of Al, Ag, Au, Pt, Pd, Ni, Nb, Mo, Ta, Ti, V, Cr, Fe, Mn, Ca, Co, W, Zn, Sn, Zr, In and Cu, and the metal compound includes the metal and at least one of C, H, N and O.

9. The touch sensor according to claim 1, wherein a thickness of the blackened layer is in a range from 320 Å to 370 Å.

10. The touch sensor according to claim 1, comprising:
    a first electrode layer formed on the transparent substrate layer, the first electrode layer comprising the conductive pattern;
    an insulating interlayer formed on the first electrode layer; and
    a second electrode layer formed on the insulating interlayer, the second electrode layer comprising the conductive pattern.

11. The touch sensor according to claim 10, wherein the first electrode layer and the second electrode layer each has a mesh structure, and the mesh structure comprises the conductive pattern.

12. The touch sensor according to claim 10, further comprising a protective layer formed on the second electrode layer.

13. An image display device, comprising:
    a display panel; and
    the touch sensor according to claim 1 stacked on the display panel.

* * * * *